US010513190B2

(12) United States Patent
Huang et al.

(10) Patent No.: US 10,513,190 B2
(45) Date of Patent: Dec. 24, 2019

(54) METHODS AND APPARATUS FOR TUNING AND CONTROLLING DOUBLE COUPLE INDUCTIVE POWER TRANSFER SYSTEMS

(71) Applicant: WiTricity Corporation, Watertown, MA (US)

(72) Inventors: Chang-Yu Huang, Auckland (NZ); Nicholas Athol Keeling, Auckland (NZ); Jonathan Beaver, Auckland (NZ); Michael Le Gallais Kissin, Auckland (NZ); Mickel Bipin Budhia, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 714 days.

(21) Appl. No.: 14/483,000

(22) Filed: Sep. 10, 2014

(65) Prior Publication Data

US 2016/0068070 A1 Mar. 10, 2016

(51) Int. Cl.
*H02J 7/02* (2016.01)
*B60L 11/18* (2006.01)
(Continued)

(52) U.S. Cl.
CPC ............ *B60L 11/182* (2013.01); *B60L 53/12* (2019.02); *B60L 53/30* (2019.02); *B60L 53/39* (2019.02);
(Continued)

(58) Field of Classification Search
CPC ........ H02J 7/025; H01F 38/14; B60L 11/182; Y02T 90/14
(Continued)

(56) References Cited

U.S. PATENT DOCUMENTS

| 5,669,470 | A | 9/1997 | Ross | |
|---|---|---|---|---|
| 2011/0199028 | A1 | 8/2011 | Yamazaki et al. | |
| 2011/0285210 | A1* | 11/2011 | Lemmens | H02J 5/005 307/104 |
| 2012/0161530 | A1* | 6/2012 | Urano | H02J 7/025 307/104 |

(Continued)

FOREIGN PATENT DOCUMENTS

| CN | 1088521 A | 6/1994 |
|---|---|---|
| CN | 101194406 A | 6/2008 |

(Continued)

OTHER PUBLICATIONS

International Search Report and Written Opinion—PCT/US2015/047204—ISA/EPO—dated Nov. 13, 2015.

*Primary Examiner* — Richard Isla
*Assistant Examiner* — Johali A Torres Ruiz
(74) *Attorney, Agent, or Firm* — Knobbe Martens Olson & Bear LLP

(57) ABSTRACT

An apparatus for transmitting charging power wirelessly to a vehicle is provided. The apparatus comprises a first coupler having a first reactance at an operating frequency and configured to wirelessly receive power from a power source, the first coupler wound on a ferromagnetic core. The apparatus comprises a first capacitor having a second reactance at the operating frequency and electrically connected in series with the first coupler, the second reactance having a magnitude equal to a magnitude of the first reactance. The apparatus comprises a second capacitor electrically connected in parallel across the first coupler and the first capacitor. The apparatus comprises a first base coupler configured to be electrically connected in parallel across the second capacitor via a first switch. A magnitude of a peak voltage across the second capacitor is proportional to a magnitude of a peak voltage induced in the first coupler at the operating frequency.

23 Claims, 10 Drawing Sheets

(51) Int. Cl.
*H01F 38/14* (2006.01)
*H02J 5/00* (2016.01)
*B60L 53/39* (2019.01)
*B60L 53/12* (2019.01)
*B60L 53/30* (2019.01)

(52) U.S. Cl.
CPC .............. *H01F 38/14* (2013.01); *H02J 5/005* (2013.01); *H02J 7/025* (2013.01); *B60L 2210/30* (2013.01); *B60L 2210/40* (2013.01); *Y02T 10/7005* (2013.01); *Y02T 10/7088* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
USPC ......................................................... 320/108
See application file for complete search history.

(56) References Cited

U.S. PATENT DOCUMENTS

| | | | |
|---|---|---|---|
| 2012/0217111 A1* | 8/2012 | Boys .................. | H01F 38/14 191/10 |
| 2013/0002037 A1 | 1/2013 | Doi | |
| 2013/0009475 A1 | 1/2013 | Nunoya et al. | |
| 2013/0093390 A1 | 4/2013 | Partovi | |
| 2013/0214591 A1 | 8/2013 | Miller et al. | |
| 2014/0132210 A1 | 5/2014 | Partovi | |
| 2014/0167520 A1* | 6/2014 | Moh .................... | H04B 5/0037 307/104 |
| 2015/0355359 A1* | 12/2015 | Miyashita ............. | H02J 7/025 324/207.16 |
| 2017/0005525 A1* | 1/2017 | Lecias, Jr. ............ | H01F 38/14 |

FOREIGN PATENT DOCUMENTS

| | | |
|---|---|---|
| EP | 1335476 A1 | 8/2003 |
| JP | 2011-188733 | 9/2011 |
| JP | 2013-013207 | 1/2013 |
| WO | WO-2014035263 A1 | 3/2014 |

\* cited by examiner

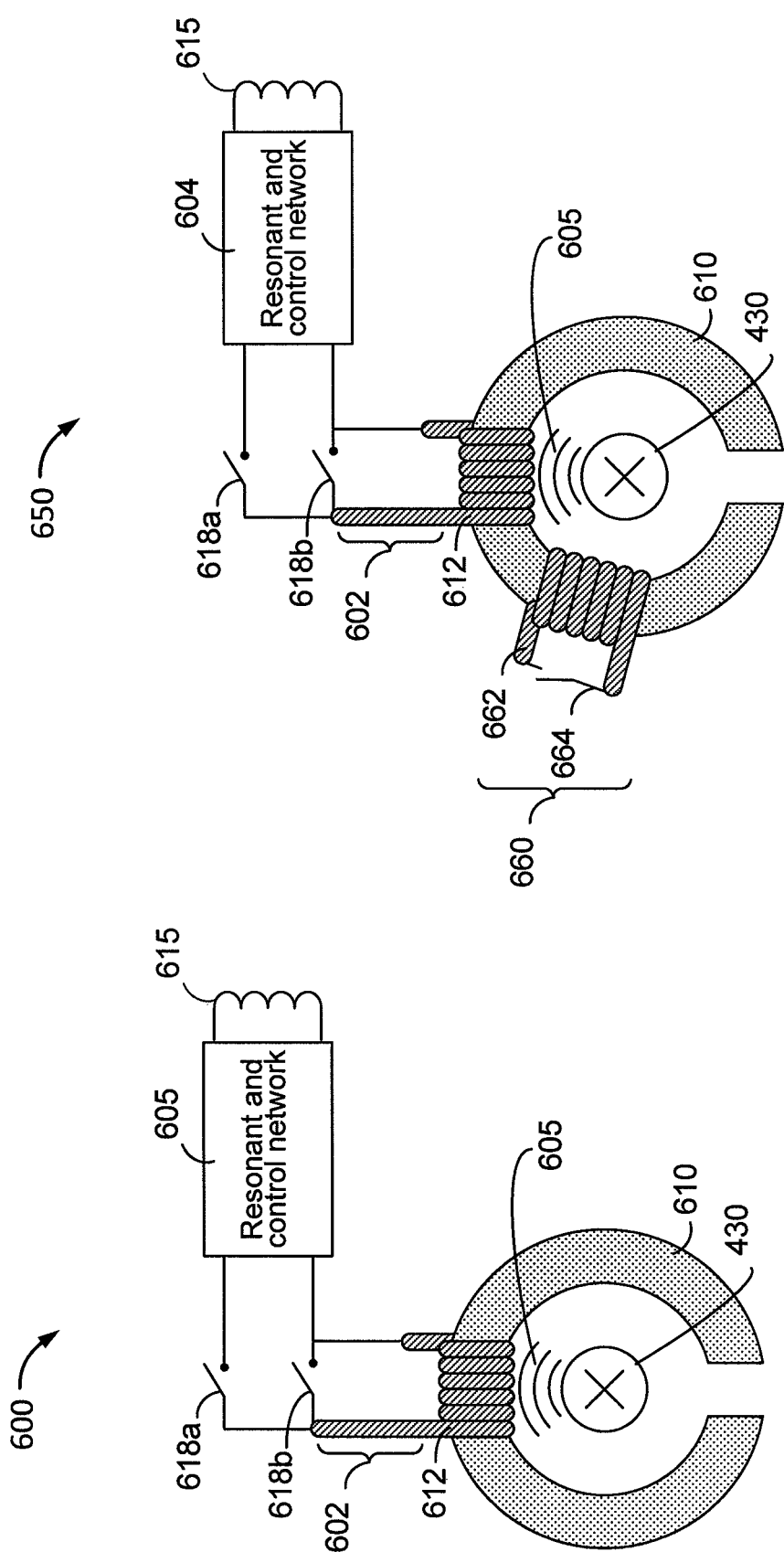

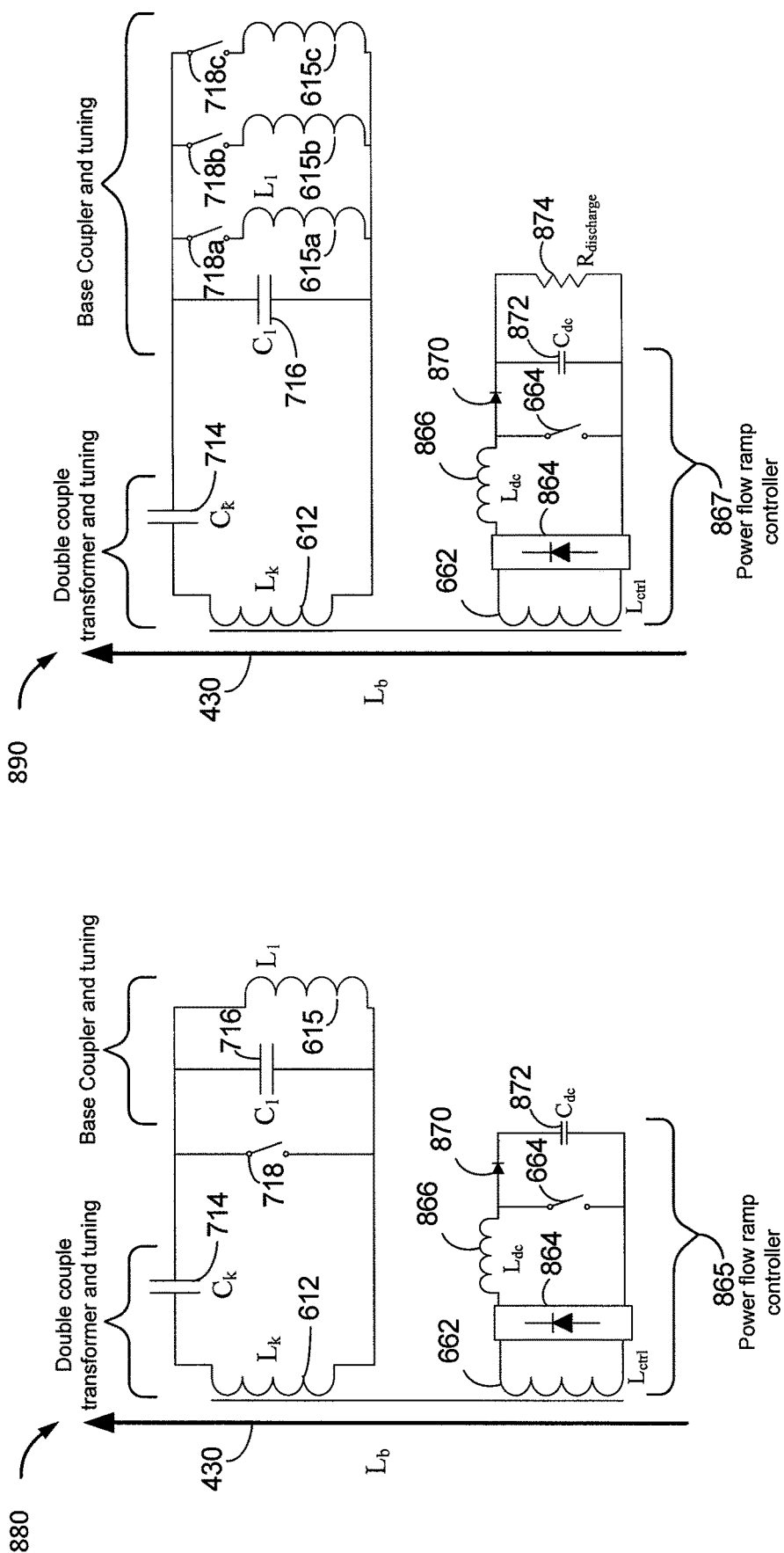

METHODS AND APPARATUS FOR TUNING AND CONTROLLING DOUBLE COUPLE INDUCTIVE POWER TRANSFER SYSTEMS

FIELD

This application is generally related to wireless power charging of chargeable devices such as electric vehicles.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless charging systems that are capable of transferring power in free space (e.g., via a wireless field) to be used to charge the electric vehicle to overcome some of the deficiencies of wired charging solutions.

Embodiments of wireless charging systems may require the use of ferromagnetic materials. The presence of such materials may influence the overall reactive power balance of a system. Accordingly, wireless charging systems should be capable of balancing overall reactive power using existing system components to properly coordinate the transfer of power continuously to a moving receiver.

SUMMARY

According to some, embodiments, an apparatus for transmitting charging power wirelessly to a vehicle is provided. The apparatus comprises a first coupler having a first reactance at an operating frequency. The first coupler is configured to wirelessly receive power from a power source. The first coupler is wound on a ferromagnetic core. The apparatus comprises a first capacitor having a second reactance at the operating frequency. The first capacitor is electrically connected in series with the first coupler. The second reactance has a magnitude equal to a magnitude of the first reactance. The apparatus comprises a second capacitor electrically connected in parallel across the first coupler and the first capacitor. The apparatus comprises a first base coupler configured to be electrically connected in parallel across the second capacitor via a first switch.

In some other embodiments, a method for transmitting charging power wirelessly to a vehicle is provided. The method comprises selecting a first reactance of a first coupler to have a magnitude equal to a magnitude of a second reactance of a first capacitor at the operating frequency. The first coupler is wound on a ferromagnetic core and is electrically connected in series with the first capacitor. The method comprises receiving power wirelessly from a power source utilizing the first coupler. The method comprises selectively electrically connecting a first base coupler in parallel across a second capacitor electrically connected in parallel across the first coupler and the first capacitor utilizing a first switch. The method comprises providing the power to the first base coupler.

In yet some other embodiments an apparatus for transmitting charging power wirelessly to a vehicle is provided. The apparatus comprises means for wirelessly receiving power from a power source. The means for wirelessly receiving power has a first reactance at an operating frequency. The apparatus comprises first means for storing electric charge having a second reactance at the operating frequency. The first means for storing electric charge is electrically connected with the means for wirelessly receiving power. The second reactance has a magnitude equal to a magnitude of the first reactance. The apparatus comprises second means for storing electric charge connected with the means for wirelessly receiving power and the first means for storing electric charge. The apparatus comprises first means for wirelessly transmitting power configured to be electrically connected with the second means for storing electric charge.

In yet some other embodiments, a non-transitory computer-readable medium comprising code is provided. The code, when executed, causes an apparatus to select a first reactance of a first coupler to have a magnitude equal to a magnitude of a second reactance of a first capacitor at the operating frequency. The first coupler is wound on a ferromagnetic core and is electrically connected in series with the first capacitor. The code, when executed, causes the apparatus to receive power wirelessly from a power source utilizing the first coupler. The code, when executed, causes the apparatus to selectively electrically connect a first base coupler in parallel across a second capacitor electrically connected in parallel across the first coupler and the first capacitor utilizing a first switch. The code, when executed, causes the apparatus to provide the power to the first base coupler.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

FIG. 6A depicts a wireless power transfer system, in accordance with an exemplary embodiment.

FIG. 6B depicts a wireless power transfer system with a ramp control switch, in accordance with an exemplary embodiment.

FIGS. 8A-8D are schematic diagrams illustrating the electrical relationship between the components of FIG. 6B, in accordance with some exemplary embodiments.

DETAILED DESCRIPTION

Figure 1:
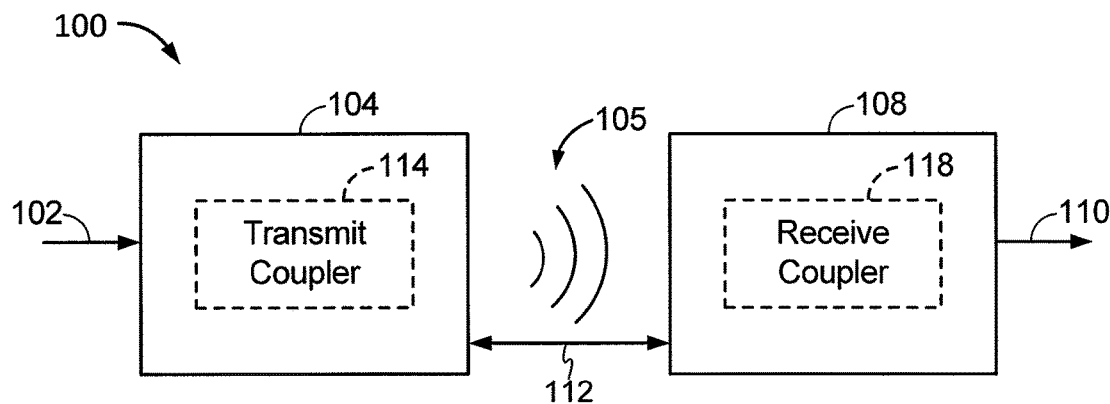
FIG. 1 is a functional block diagram of a wireless power transfer system, in accordance with an exemplary embodiment.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicles may be hybrid electric vehicles that include a traditional combustion engine for direct locomotion or for charging the vehicle's battery in addition to electric motors. Other electric vehicles may draw all locomotive ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular embodiments only and is not intended to be limiting of the disclosure. It will be understood that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of a wireless power transfer system 100, in accordance with an exemplary embodiment. An input power 102 may be provided to a transmitter 104 from a power source (not shown) to generate a time varying wireless (e.g., magnetic or electromagnetic) field 105 with a frequency corresponding to the resonant frequency of the transmit coupler 114 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one example embodiment, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space.

As such, wireless power transfer may be provided over a larger distance in contrast to purely inductive solutions that may require large couplers which are very close (e.g., within millimeters). Resonant inductive coupling techniques may thus allow for improved efficiency and power transfer over various distances and with a variety of inductive coupler configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit coupler 114 for coupling energy to the receiver 108. The receiver 108 may include a receive coupler 118 for receiving or capturing energy transmitted from the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114.

As described above, efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118. The area around the transmit coupler 114 and the receive coupler 118 where this coupling may occur is referred to herein as a coupling-mode region.

Figure 2:
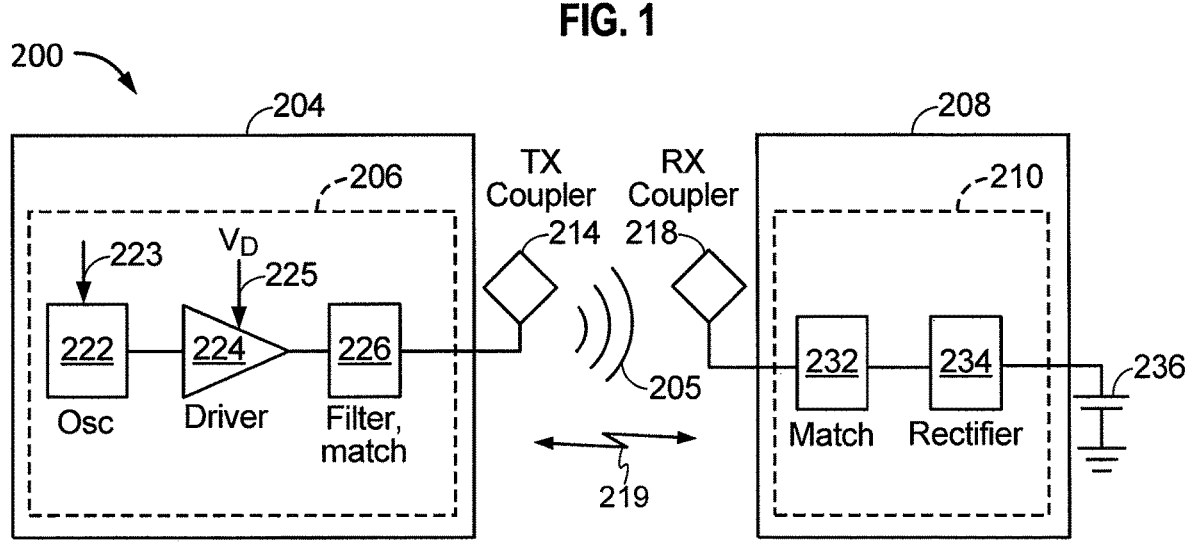
FIG. 2 is a functional block diagram of a wireless power transfer system, in accordance with another exemplary embodiment.

FIG. 2 is a functional block diagram of a wireless power transfer system 200, in accordance with another exemplary embodiment. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 may filter out harmonics or other unwanted frequencies and match the impedance of the transmitter 204 to the transmit coupler 214. As a result of driving the transmit coupler 214, the transmit coupler 214 may generate a wireless field 205 to wirelessly output power at a level sufficient for charging a battery 236 of the electric vehicle 605, for example.

The receiver 208 may include a receive circuitry 210 that may include a matching circuit 232 and a rectifier circuit 234. The matching circuit 232 may match the impedance of the receive circuitry 210 to the receive coupler 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some embodiments, the receiver 208 may be configured to determine whether an amount of power transmitted by the transmitter 204 and received by the receiver 208 is appropriate for charging the battery 236.

Figure 3:
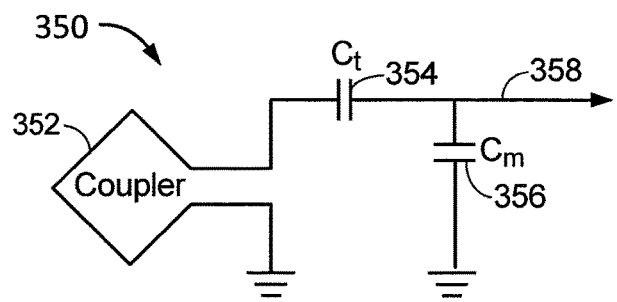
FIG. 3 is a schematic diagram of a portion of transmit circuitry or receive circuitry of FIG. 2 including a transmit or receive coupler, in accordance with an exemplary embodiment.

FIG. 3 is a schematic diagram of a portion of the transmit circuitry 206 or the receive circuitry 210 of FIG. 2, in accordance with some exemplary embodiments. As illustrated in FIG. 3, a transmit or receive circuitry 350 may include a coupler 352. The coupler 352 may also be referred to or be configured as a "conductor loop" 352 or as a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added to the coupler's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger sized couplers using large diameter coils exhibiting larger inductance, the value of capacitance needed to produce resonance may be lower. Furthermore, as the size of the coupler increases, coupling efficiency may increase. This is mainly true if the size of both base and electric vehicle couplers increase. For transmit couplers, the signal 358, with a frequency that substantially corresponds to the resonant frequency of the coupler 352, may be an input to the coupler 352.

Many current wireless vehicle charging systems require the electric vehicle being charged to be stationary, i.e., stopped near or above the base coupler such that the electric vehicle maintains presence within the wireless field generated by the base coupler. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

For example, the electric vehicle may travel along a roadway having a dynamic wireless charging system. The dynamic wireless charging system may comprise a plurality of the base couplers placed linearly along a path of travel. The electric vehicle may request the dynamic wireless charging system activate the base couplers along the electric vehicle's path of travel. Such dynamic charging may also serve to reduce or eliminate the need for auxiliary or supplemental motor systems in addition to the electric locomotion system of the electric vehicle (e.g., a secondary gasoline engine of the hybrid/electric vehicle).

Figure 4:
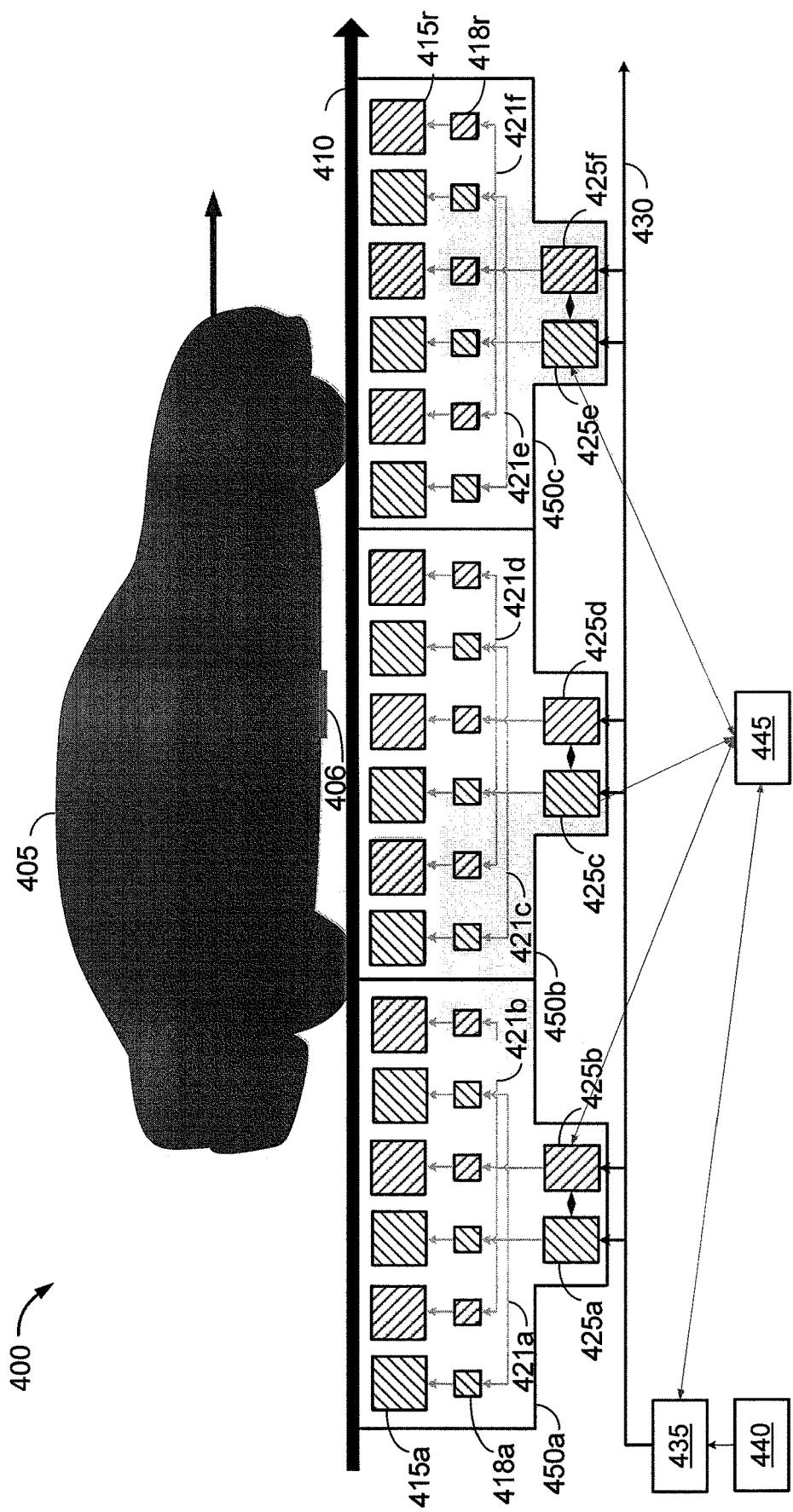
FIG. 4 illustrates a functional block diagram of an electric vehicle with at least one vehicle coupler in the presence of a wireless power transfer system, in accordance with an exemplary embodiment.

FIG. 4 illustrates a functional block diagram of an electric vehicle 405 with at least one vehicle coupler 406 in the presence of a wireless power transfer system 400, in accordance with an exemplary embodiment. As shown in FIG. 4, various components of a distribution network of a wireless power transfer system 400 are installed beneath, along or beside a roadway 410. The roadway 410 extends from the left side of FIG. 4 to the right side of FIG. 4, with a direction of travel of the electric vehicle 405 aligned with the roadway 410. The electric vehicle 405 may comprise at least one vehicle coupler 406, similar to the receivers 108/208, as previously described in connection with FIGS. 1 and 2, respectively. In some embodiments, the at least one vehicle coupler 406 may comprise a polarized coupling system (e.g., a double-D coupler), a quadrature coupler system, combined double-D quadrature coupler system, or any other system utilizing any other type or shape of coupler (e.g., circular, rectangular, or solenoid shaped couplers). A vehicle pad 406 (secondary coil) may couple with the magnetic field emitted by the primary coil to receive flux. In some embodiments, the vehicle pad 406 (secondary coil) may be selected to compliment the primary coil(s) so as to couple with as much of the magnetic field to maximize the received flux. If the primary coil is producing polarized (i.e., horizontal) flux, then a polarized type of vehicle pad 406 may be used in the coupling system (e.g., a double-D coil or a solenoid); alternatively, if the primary coil is producing vertical flux, then a circular coil or a quadrature coil may be used. If the primary coil is producing a combination of horizontal and vertical flux, then a combination vehicle pad 406 may be used, e.g., a DDQ coil. The "double-D" may refer to placing two D-shaped coils back to back such that the overall shape of the coil is round. A quadrature coil may use four coils as opposed to only two, in various geometries.

The dynamic wireless charging system 400 may comprise a plurality of base couplers 415a-415r installed in, on, beside, or flush with the roadway 410. Each of the plurality of base couplers 415a-415r may be configured to generate a wireless field (see the wireless field 205 of FIG. 2) for wirelessly transferring power to the electric vehicle 405 via the at least one vehicle coupler 406 when activated. Each of a plurality of switches 418a-418r may be configured to operationally connect a respective one of the base couplers 415a-415r to one of a plurality of local controllers 425a-425f via one of a plurality of distribution circuits 421a-421f. The local controllers 425a-425f may be configured to wirelessly receive power from a power supply/inverter 435, via an alternating current (AC) power backbone 430, and control an amount of power transferred to one or more of the plurality of base couplers 415a-415f via the switches 418a-418r. The power supply/inverter 435 may receive its power from a power source 440. The power source 440 and/or the power supply/inverter 435 may be sized based on a number of base couplers 415 to power, a number of local controllers 425, and/or a number and type of electric vehicles 405 to be charged. The power source 440 and power supply/inverter 435 may provide current at a frequency utilized by the base couplers 415 or, alternatively, at some higher or lower frequency. The AC power backbone 430 may comprise a loop conductor that distributes the high frequency (HF) power and may be capable of synchronizing the base couplers 415 and/or the local controllers 425 that are near each other to a single phase. Thus, the AC power backbone 430 may be considered a phase reference that also distributes power.

A distribution controller 445 may be in communication with the power supply/inverter 435 and the local controllers 425a-425f and may be configured to provide global coordination of power control between the local controllers 425a-425f. Groups of the base couplers 415, the switches 418, and the local controllers 425 may comprise a series of individual Base Array Network (BAN) modules 450a-450c. The respective components of the BAN modules 450 are shaded to indicate respective common current paths.

As the electric vehicle 405 travels along the roadway 410, the distribution controller 445 may communicate with one or more of the electric vehicle 405, the power supply/inverter 435, and the local controllers 425a-425f to coordinate activation or deactivation of particular ones of the base couplers 415a-r. For example, the distribution controller 445 may command the power supply/inverter 435 to generate a current and distribute the current to the AC power backbone 430. The AC power backbone 430 may utilize the distributed current to wirelessly supply power to the local controllers 425a-425f via a "double couple transformer", the function of which will be described in more detail in connection with FIGS. 5 through 8C below.

The local controllers 425a-425f may receive the power from the AC power backbone 430 and provide a regulated amount of current to one or more of the base couplers 415a-r. In some embodiments, the local controllers 425 in each BAN module 450 may comprise individual control units capable of independent control from each other. Alternatively, the local controllers 425 of each BAN module 450 may comprise a single, shared control unit or processor. The base couplers 415a-415r may generate wireless fields according to the current received via the respective switch 418a-418r from the local controller 425a-425f and may couple to the at least one vehicle coupler 406 to wirelessly transfer power to the electric vehicle 405.

Depending on the particular embodiment, control of activation of the base couplers 415 may be shared to differing degrees between the distribution controller 445 and the local controllers 425a-425f. For example, in some embodiments, the distribution controller 445 may coordinate the activation and deactivation of the base couplers 415a-415r and may coordinate any communications or actions between multiple BAN modules 450a-450c. In some other embodiments, the distribution controller 445 may simply coordinate communications between the BAN modules 450a-450c or local controllers 425a-425f, while the local controllers 425a-425f may control the base coupler sequencing. In yet other embodiments, the distribution controller 445 may activate a particular BAN module 450a-450c, but leave timing of the base coupler activations to the associate local controller(s) 425a-425f. In yet other embodiments, the distribution controller 445 may communicate only non-critical information to the local controllers 425a-425f and not provide base coupler activation information.

Higher level coordination by the distribution controller 445, combined with the more localized current distribution and regulation at the local controllers 425a-425f may create a more responsive dynamic wireless charging system 400 with decentralized control via the local controllers 425a-425f. This may allow the local controllers 425a-425f to control current flow independently of the distribution controller 445 and allow local control of impedance matching and reactive voltage/amperage (VAr) loading. Such localized control may provide a decreased VAr load compensation response time since instructions need only come from the local controller 425a-425f and not from the distribution controller 445.

The distribution controller 445 may also obtain information regarding the velocity of the electric vehicle 405 for controlling activation of particular ones of the base couplers 415a-415r. The distribution controller 445 may obtain this information from the electric vehicle 405 or from various sensors or load analysis of the base couplers 415a-415r. In other embodiments, each of the BAN modules 450a-450c may sense the presence of the electric vehicle 405 and autonomously and selectively activate the appropriate base couplers 415a-415r according to a detected presence or location of the electric vehicle 405. In yet other embodiments, the BAN modules 450a-450c may receive a signal comprising information regarding the electric vehicle 405 velocity and/or position or an activation command from a neighboring BAN module. The received signal may come directly from the neighboring BAN module (e.g., a corresponding local controller 425) or via the distribution controller 445.

When a respective local controller 425 receives a signal from the distribution controller 445 to activate a specific base coupler 415, the respective local controller 425 may activate the switch 418 corresponding to the specific base coupler 415. As the vehicle 405 continues in the direction of travel, the local controllers 425a-425f may receive commands from the distribution controller 445 to activate or deactivate specific base couplers 415a-415r based on the position of the vehicle coupler 406. The local controllers 425a-425f may further control or regulate the current from the AC power backbone 430.

As depicted, the base couplers 415 from consecutive local controllers 425 may be interleaved or interlaced such that a single local controller 425 may provide power to alternating base couplers 415. Thus, the base couplers 415 from a first local controller 425 may be proximally interleaved with the base couplers 415 controlled by a second local controller 425 when the two local controllers 425 are within the same BAN 450. Thus, alternating base couplers 415 may be powered by different local controllers 425 and one local controller need not simultaneously power two adjacent base couplers 415. Additionally, preventing a single local controller 425 from providing current to consecutive or adjacent base couplers 415 may reduce power rating requirements of individual components, as each component need only be capable of handling the current load of a single base coupler 415 at a given time.

A wireless power transfer system having unbalanced reactive power loading may be able to transfer less power than a system having a balanced reactive power loading between the power source (e.g. the AC power backbone 430) and the load, or receiver (e.g., the base couplers 415). For example, unbalanced reactive power may result in thermal losses, voltage differences between the source and sink, and a decrease in voltage stability, among other factors. Accordingly, in some embodiments, the local controllers 425a-425f may each comprise a tuning circuit or network to tune the current, and consequently the power, available to currently activated base coupler(s) 415. Such tuning circuits may allow for maintaining an optimum, or balanced VAr of the wireless charging system 400 within a small range (e.g., +/−5%) of the designed power tuning value.

In an exemplary dynamic wireless charging system, there may be a number of factors that impact the power supply tuning network. Certain systems may suffer from tuning capacitor aging. As a capacitor ages, the capacitive characteristics of the component may diminish. In an embodiment, the AC power backbone 430 may vary in length, affecting the overall VAr loading of the system. In an embodiment, various vehicle tuning topologies may affect the AC power backbone 430 VAr loading in different ways, reflecting different amounts of reactive power load back to the AC power backbone 430 (e.g., based on the vehicle charging system design).

In an embodiment, the tuning circuit or network may be configured to function with only one base coupler 415 activated. In another embodiment, the tuning circuit or network may be configured to function with multiple base couplers 415 being activated or be applied to one or more of the BANs 450a-450c. In another embodiment, the tuning circuit or network may be configured to function with a single base coupler 415 or with multiple base couplers 415 being activated and receiving a current from a respective local controller 425.

Figure 5:
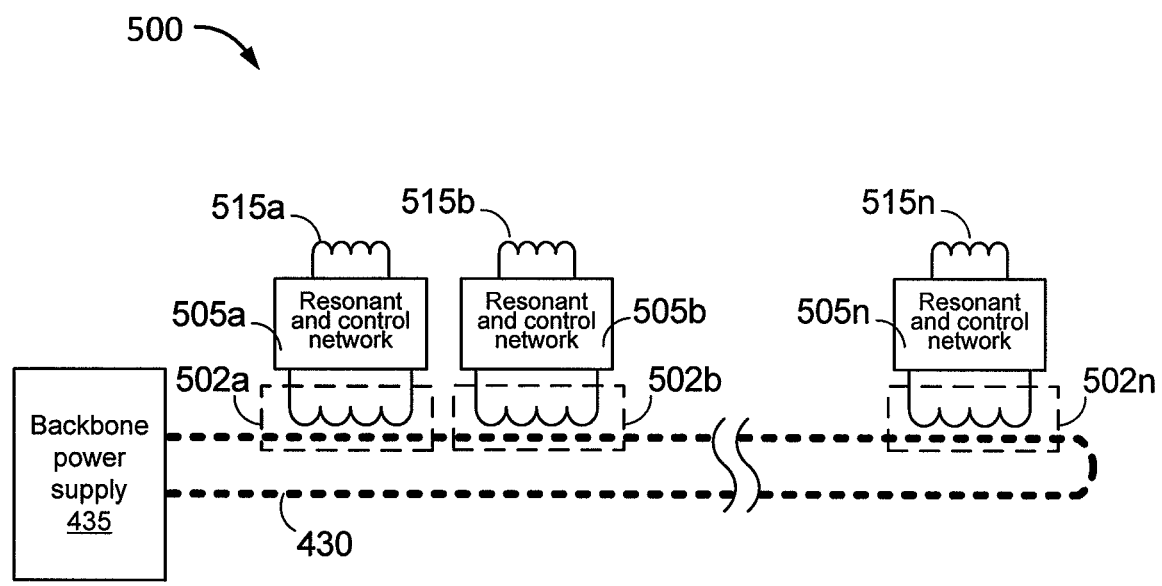
FIG. 5 depicts another block diagram of a wireless power transfer system corresponding to the wireless power transfer system of FIG. 4.

FIG. 5 depicts another block diagram of a wireless power transfer system 500 corresponding to the wireless power transfer system 400 of FIG. 4. As shown in FIG. 5, the wireless power transfer system 500 comprises the power supply 435 of FIG. 4 electrically connected to the AC power backbone 430 of FIG. 4. The system 500 additionally includes a plurality of resonant and control networks ("network") 505a-505n each connected to a respective one of a plurality of double couple transformers 502a-502n and to one or more base couplers 515a-515n. The networks 505a-505n may correspond to networks comprising one or more of the local controllers 425, the distribution circuits 421 and the switches 418, as previously described in connection with FIG. 4. Accordingly, the networks 505a-505n may complete the switching functions of the switches 418 and may provide current for the proper functioning of the base couplers 515a-515n. The base couplers 515a-515n may correspond to the base couplers 415, as previously described in connection with FIG. 4. However, each of the base couplers 515a-515n may also be representative of multiple ones of the base couplers 415a-415r. Although three (3) networks 505a-505n are shown, any number of networks may be utilized according to a particular embodiment.

In a roadway application, such as that shown in FIG. 4, a number of double couple transformers 502a-502n may be implemented to transfer power from the AC power backbone 430 to each of the base couplers 515a-515n. "Double couple," as used herein, generally relates to the notion that there are two wireless couplings associated with each double couple transformer: a first coupling between the backbone 430 and the double couple transformer 502a-502n and a second coupling between the base couplers 515a-515n and the vehicle pad 406 (see FIG. 4), hence "double couple." The double couple transformers 502a-502n may each comprise at least one coil (e.g., a coupler or a transformer) configured to wirelessly couple with the AC power backbone 430 and receive wireless power. The double couple transformers 502a-502n may then supply current and power via the respective network 505a-505n to the base coupler(s) 515a-515n. The double couple transformers 502a-502n are depicted as operationally coupled to a single base coupler 515 for simplicity. However, each of the BANs 450a-450c as previously described in connection with FIG. 4, may comprise two or more double couple transformers, for example, providing power to each of three of the base couplers 415. Each double couple transformer 502a-502n may comprise a series of windings on or around a core comprising ferromagnetic materials (e.g., ferrite), as will be described in more detail in connection with FIGS. 6A and 6B below. The double couple transformers 502a-502n may operate similar to a transformer, receiving wireless power from the AC power backbone 430 via a wireless field (see the wireless field 205 of FIG. 2). The wireless power received at the double couple transformer 502a-502n may then be transferred through the respective network 505a-505n and ultimately to the base couplers 515a-515n.

The base couplers 515a-515n may be controlled (e.g., activated and deactivated) via commands from the networks 505a-505n, in a manner similar to that utilized by the local controllers 425a-524f to control the base couplers 415a-415r, as previously described in connection with FIG. 4.

FIG. 6A depicts a wireless power transfer system 600, in accordance with an exemplary embodiment. The system 600 may comprise a core 610 in proximity to the AC power backbone 430. The core 610 may comprise ferrite or some other suitable ferromagnetic material. The core 610 may have at least one series of windings comprising a coupler 612 wound on or around the core 610 and configured to wirelessly couple with a wireless field 605 produced by the AC power backbone 430. The wireless field 605 may be a magnetic (electromagnetic) field similar to the wireless fields 105/205 (FIGS. 1 and 2 respectively). In FIG. 6A, the core 610 is shown partially surrounding the backbone 430. However the present application is not so limited and the core 610 may be disposed in other configurations allowing wireless coupling that do not surround the backbone 430 (e.g., the core 610 being positioned next to or alongside the backbone 430).

The system 600 may further comprise a resonant and control network (network) 605 operationally coupled to the coupler 612 and configured to selectively provide current to at least one base coupler 615. The coupler 612 may be a part of a double couple transformer 602. The network 605, the base coupler 615 and the double couple transformer 602 may correspond to the networks 505a-505n, the base couplers 515a-515n and the double couple transformers 502a-502n, respectively, as previously described in connection with FIG. 5.

Whether or not the current induced in the coupler 612 is used by the network 605, the core 610 represents an inductive load to the AC power backbone 430. Accordingly, in some embodiments, additional inductors or capacitors (e.g., a compensation circuit) may be implemented within the system 600 to compensate for variations in VAr loading.

Inductors and capacitors may be used in series or in parallel with the inductive load to increase or decrease the VAr loading as measured at the power supply 435 (see FIGS. 4 and 5). Such an active compensation circuit may conventionally require the addition of separate electronic components, increasing the cost and complexity of the system. However, the system 600 may not require such additional components in an active compensation circuit for VAr load compensation.

The system 600 may further comprise a plurality of control switches 618 (e.g., control switches 618*a* and 618*b*). The control switches 618 may operationally connect the coupler 612 of the double couple transformer 602 to the network 605. The positions of each of the switches 618 may serve to adjust the impedance of the system 600 on the backbone 430, thus compensating for VAr loading.

In an embodiment, three primary switch states may be considered. In a first, powered state, the switch 618*a* is closed and the switch 618*b* is open. This powered switch state completes the circuit for the current induced in the double couple transformer 602 allowing the current to flow and provide power to the network 605, and in turn to the base coupler 615.

In a second, open circuit switch state, the switch 618*a* and the switch 618*b* are both open. This open circuit state opens the circuit, removing power from the circuit and eliminating current flow to the network 605 and the base coupler 615. In the open state, the system 600 remains an inductive load (e.g., an impedance) on the AC power backbone 430, increasing the VAr load.

In a third, short circuit switch state, the switch 618*b* is closed, short circuiting the coupler 612. The short circuit switch state nearly eliminates the system 600 as an inductive load on the AC power backbone 430, reducing the impedance to a negligible value. By shorting the coupler 612 of the double couple transformer 602, the presence of the core 610 becomes nearly invisible to the AC power backbone 430.

Accordingly, the incorporation of the control switches 618 providing the three states (powered, open, short) may serve as an inductive load compensation system using existing components (e.g., the system 600) without the addition of additional circuitry as noted above. In an embodiment, the inactive double couple transformers 502, 602 (see FIGS. 5 and 6) within a BAN 450 may therefore be used to tune the overall VAr loading of the system 400, as previously described in connection with FIG. 4.

In an embodiment, the double couple transformer 602 of the system 600 (FIG. 6A) may support high voltage (e.g., 25-50 kw), as previously described in connection with FIG. 4. In such an environment, the resonant and control network 605 may be exposed to very high transient voltages when the coupler 612 is shorted using only the switch 618*b*. The very high transient voltages may negatively affect the connected electronic components (e.g., of the resonant and control network 605, the switches 618, etc.) and in some embodiments may lead to component failure. Advantageously, in some embodiments, as will be described in connection with FIG. 6B below, a shunt pathway may be provided for the current that would be induced in the coupler 612 to reduce or eliminate the high transient voltages when the switch 618*a* is opened.

FIG. 6B depicts a wireless power transfer system 650 having a ramp control switch 660, in accordance with an exemplary embodiment. The balance control switching system 650 may comprise the balance control switching system 600, as previously described in connection with FIG. 6A, as well as a power flow ramp controller (ramp controller) 660.

In some embodiments, the ramp controller 660 comprises a control coupler 662 having windings that are also wound on or around the core 610. The ramp controller 660 may further comprise a control switch 664 operably connected to the coupler 662. In some embodiments, the ramp controller 660 may be adjacent to the double couple transformer 602. However, the couplers 612 and 662 may be electrically isolated from one another. Similar to the coupler 612, the coupler 662 may be situated within the wireless field 605. Thus the couplers 612 and 662 may be wirelessly coupled simultaneously to the AC power backbone 430.

Figure 7C:
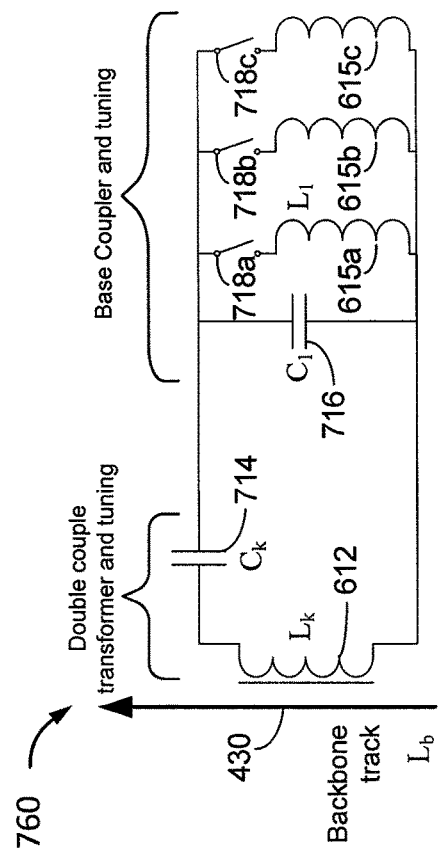
FIGS. 7A-7D are schematic diagrams illustrating the electrical relationship between the components of FIG. 6A, in accordance with some exemplary embodiments.
Figure 7D:
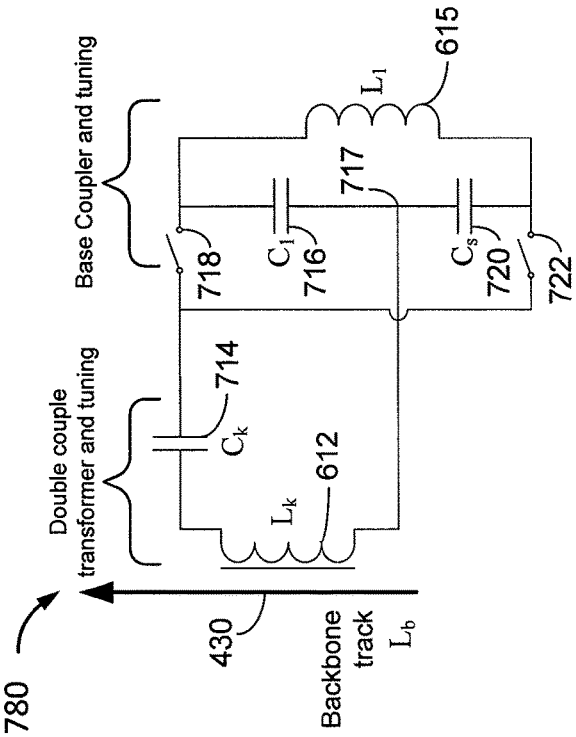
Figure 7A:
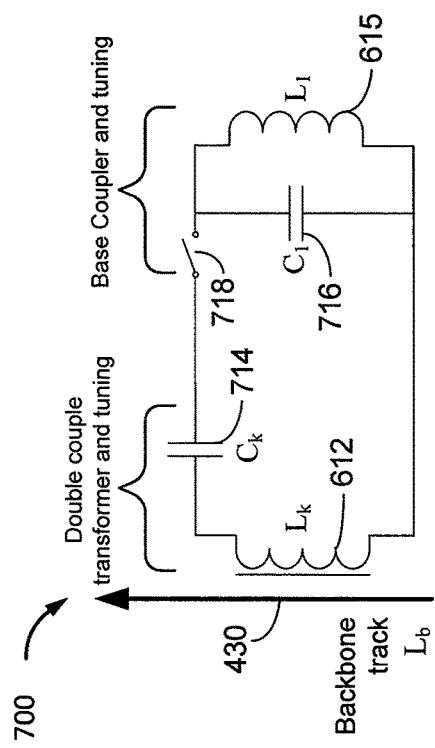

FIG. 7A is a schematic diagram 700 illustrating the electrical relationship between the components of FIG. 6A, in accordance with an exemplary embodiment. As shown in FIG. 7A, the AC power backbone 430 is inductively coupled to the coupler 612 (see FIG. 6A). The coupler may be connected in series with a tuning capacitor $C_k$ 714, which may in turn be selectably coupled in series with a parallel arrangement of a tuning capacitor 716 and the base coupler 615 via a switch 718. Thus, the arrangement shown in FIG. 7A may comprise a series-tuned double couple transformer driving a parallel tuned base coupler structure.

In some embodiments, the values of the coupler 612 and the tuning capacitor 714 may be chosen such that a capacitive reactance of the tuning capacitor 714 is substantially equal to an inductive reactance of the coupler 612 at an operating frequency of the balance control switching system. Thus, a magnitude of a reactance of the tuning capacitor 714 may be equal to a magnitude of a reactance of the coupler 612, though opposite in sign. In this way, an inductance of the coupler 612 (e.g., a leakage inductance) may be substantially compensated for or cancelled out by the capacitance of the tuning capacitor 714.

Likewise, in some embodiments, the values of the base coupler 615 and the tuning capacitor 716 may be chosen such that a capacitive reactance of the tuning capacitor 716 is substantially equal to an inductive reactance of the base coupler 615 at an operating frequency of the balance control switching system. Thus, a magnitude of a reactance of the tuning capacitor 716 may be equal to a magnitude of a reactance of the base coupler 615, though opposite in sign. In this way, an inductance of the base coupler 615 may be substantially compensated for or cancelled out by the capacitance of the tuning capacitor 716.

In operation, an AC current passes through the AC power backbone 430 and induces a current in the coupler 612. The combination of the coupler 612 and the tuning capacitor 714 form a series-tuned double couple transformer. The series-tuned double couple transformer may provide a substantially constant magnitude AC voltage across the tuning capacitor 716 when the switch 718 is closed. Such a substantially constant AC bus voltage may provide the base coupler 615 with a substantially constant magnitude AC current. Thus, when the switch 718 is closed the coupler 612 and the tuning capacitor 714 may form a first resonant circuit that drives a second resonant circuit comprising the tuning capacitor 716 and the base coupler 615. In order to discontinue providing power to the base coupler 615 the switch 718 may be opened. However, due to the large inductance of the coupler 612, which resists instantaneous changes in current, a very high transient switching voltage may be impressed across the terminals of the open switch 718 (e.g., in excess of 1.2 kV). This may require the switch 718 to be large and relatively expensive in order to prevent high-voltage arcing across the terminals of the switch 718. For this reason, a topology as shown by FIG. 7B may be more desirable in some embodiments.

Figure 7B:
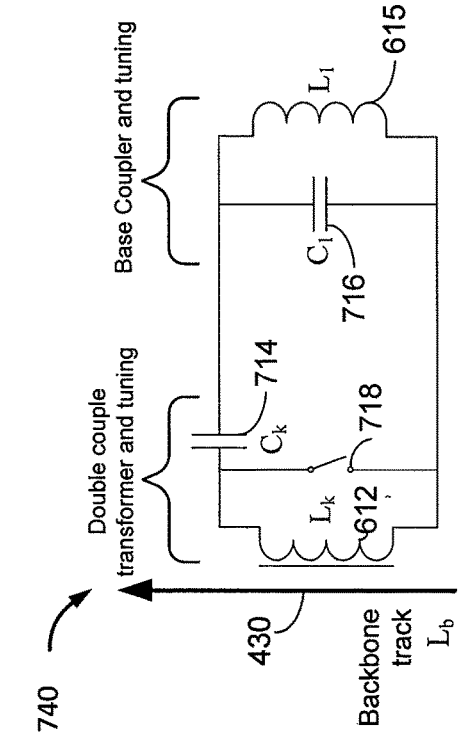

FIG. 7B is another schematic diagram 740 illustrating the electrical relationship between the components of FIG. 6A, in accordance with another exemplary embodiment. The schematic diagram 740 of FIG. 7B may be substantially the same as the schematic diagram 700 of FIG. 7A with the exception that the switch 718 is disposed in parallel across the terminals of the coupler 612 instead of between the tuning capacitor 714 and the parallel arrangement of the tuning capacitor 716 and the base coupler 615. Thus, to discontinue providing power to the base coupler 615 the switch 718 may be closed. However, in contrast to the schematic diagram 700 of FIG. 7A, in FIG. 7B, when the switch 718 is open during operation, a resonant voltage induced across the terminals of the switch 718 may be prohibitively large (e.g., 2-3 kV). This may also require the switch 718 to be large and relatively expensive to prevent arcing across the terminals of the switch 718.

FIG. 7C is yet another schematic diagram 760 illustrating the electrical relationship between the components of FIG. 6A, in accordance with yet another exemplary embodiment. As shown in FIG. 7C, the AC power backbone 430 is inductively coupled to the coupler 612, which is connected in series with the tuning capacitor $C_k$ 714. The tuning capacitor 716 may be connected across the double couple transformer comprising the coupler 612 and the tuning capacitor 714. The schematic diagram 760 may additionally include a plurality of base couplers 615a-615c, each of which may be selectably coupled in parallel with the tuning capacitor 716 via a respective one of a plurality of switches 718a-718c. Thus, the arrangement shown in FIG. 7C may comprise the series-tuned double couple transformer driving a parallel tuned arrangement of multiple base couplers. The capacitive reactance of the tuning capacitor 714 may be substantially the same as the inductive reactance of the coupler 612 at the operating frequency, as previously described in connection with FIG. 7A. However, in some embodiments, the capacitive reactance of the tuning capacitor 716 may be substantially the same as the combined apparent inductive reactance of all base couplers 615a-615c that are selectively connected to the tuning capacitor 716 at any given time. Thus, in some embodiments, the capacitive reactance of the tuning capacitor 716 may vary or be tuned according to which and how many of the base couplers 615a-615c are selectably connected to the tuning capacitor 716. However, in some other embodiments, where the capacitive reactance of the capacitor 716 is statically set based on a predetermined number of selectably connected base couplers 615a-615c, once set, the capacitive reactance of the tuning capacitor 716 may not be changed. In such embodiments, the combination of the base couplers 615a-615c for which the tuning capacitor 716 is statically set is the only combination the double couple transformer can service (e.g., if the tuning capacitor 716 is designed for a single base coupler 615a, more than the single base coupler 615a may not be enabled).

In some other embodiments, the capacitive reactance of the tuning capacitor 714 may have a magnitude that is less than a magnitude of the inductive reactance of the coupler 612. In such embodiments, the tuning capacitor 716 may be utilized to further tune the coupler 612. However, in such embodiments, the tuning capacitor 716 may no longer be able to completely compensate for the inductance of connected ones of the base couplers 615a-615c in some circumstances, since the value of the tuning capacitor 716 is chosen based on the value of the inductive reactance of the coupler 612 at the operating frequency.

Operation of the schematic diagram 760 may be substantially the same as that of the schematic diagram 700, as previously described in connection with FIG. 7A with the exception that one or more of the base couplers 615a-615c may be activated or deactivated at substantially the same time by closing the respective one of the plurality of switches 718a-718c. Moreover, since all of the base couplers 615a-615c may share the same tuning capacitor 716, a resource-efficient base coupler multiplexing structure may be realized. However, the components shown by the schematic diagram 760 may suffer from the same very high transient switching voltage, as previously described in connection with FIG. 7A, induced across the terminals of the switches 718a-718c. Moreover, as compared to FIG. 7A, there are more switches 718a-718c that should each be designed to tolerate the base coupler current, which may be higher than the current through the coupler 612 due to the resonance between the capacitor 716 and the couplers 615a-615c. Thus, although the design of FIG. 7C may require fewer capacitors (e.g., the capacitor 716), the silicon on which the capacitor 716 and/or the switches 718a-718c are formed may cost more due to such high current tolerances.

FIG. 7D is yet another schematic diagram 780 illustrating the electrical relationship between the components of FIG. 6A, in accordance with yet another exemplary embodiment. As shown in FIG. 7D, the AC power backbone 430 is inductively coupled to the coupler 612, which is electrically connected in series to the tuning capacitor 714. The coupler 612 and the capacitor 714 may make up the double couple transformer. As further shown in FIG. 7D, a tuning capacitor 716 may be connected in series with another tuning capacitor 720 at a node 717. A base coupler 615 may be connected in parallel across the series combination of the tuning capacitors 716 and 720. A first terminal of the coupler 612 may be connected to a first terminal of the tuning capacitor 714, while a second terminal of the coupler 612 may be connected to the node 717. A second terminal of the tuning capacitor 714 may be connected to one terminal of each of a first switch 718 and a second switch 720, where the opposite terminals of the switches 718 and 720 may be connected to respective terminals of the base coupler 615. Thus, the embodiment of FIG. 7D may comprise a series-tuned double couple transformer, as in FIGS. 7A-7C, however, having a parallel and partial series tuning arrangement for the base coupler 615 and capacitors 716 and 720.

As previously described in connection with FIGS. 7A-7C, the capacitive reactance of the tuning capacitor 714 may be substantially the same as the inductive reactance of the coupler 612 at the operating frequency. In some embodiments, the total equivalent capacitive reactance of the parallel, partial-series arrangement of tuning capacitors 716 and 720 may be substantially the same as the inductive reactance of the base coupler 615. Thus, the values of the tuning capacitors 716 and 720 are not necessarily (e.g., required to be) the same as one another.

In each of FIGS. 7A-7D, a voltage across the capacitor 716 may be proportional to a voltage induced in the coupler 612 at the operating frequency of the system. Accordingly, a magnitude of a peak voltage across the capacitor 716 may also be proportional to a magnitude of a peak voltage induced in the coupler 612 at the operating frequency.

Figures 8A, 8B:
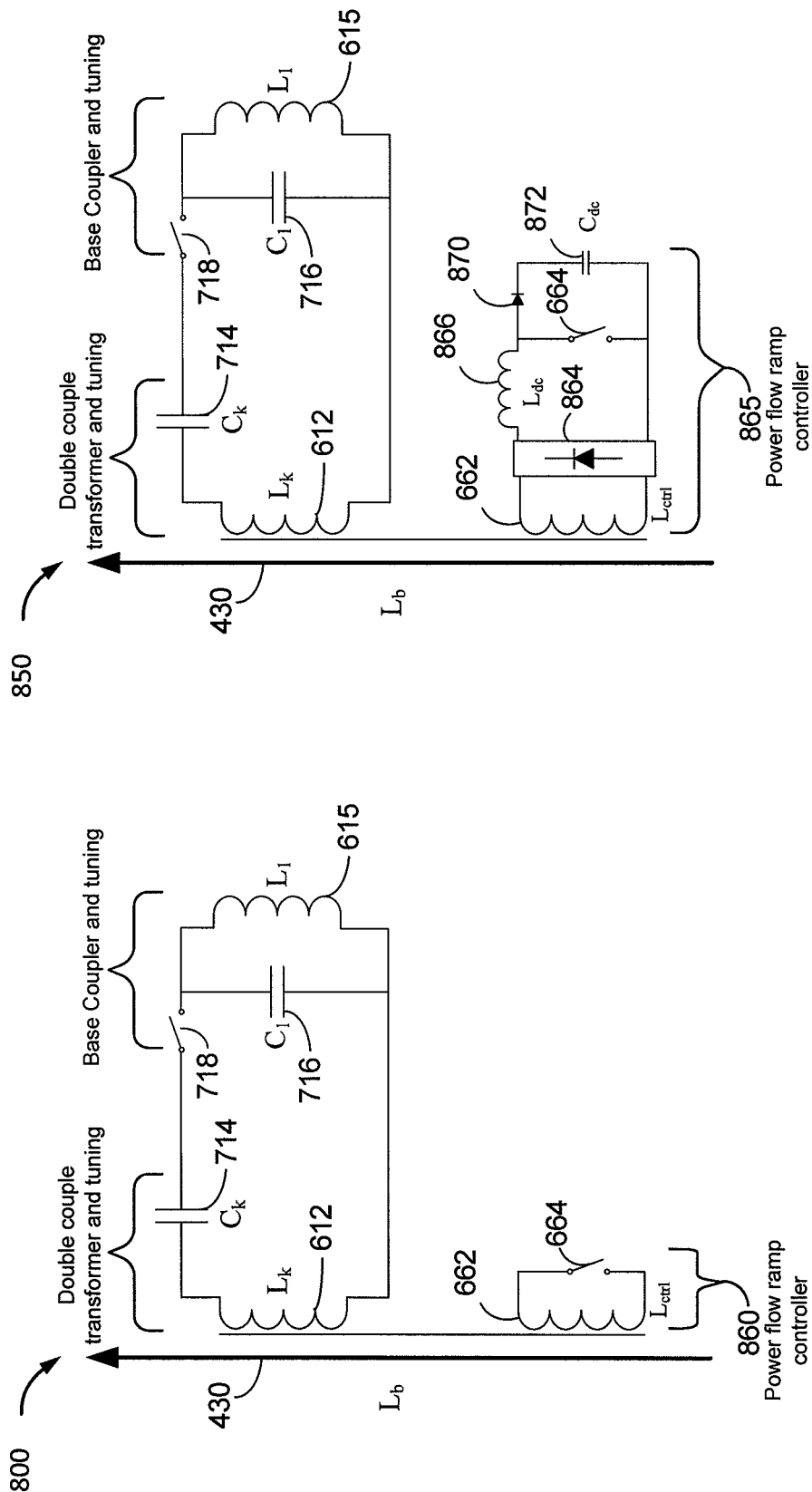

FIG. 8A is a schematic diagram 800 illustrating the electrical relationship between the components of FIG. 6B, in accordance with an exemplary embodiment. As shown in FIG. 8A, the schematic diagram 800 includes all components as previously described in connection with FIG. 7A. The schematic diagram 800 also includes a power flow ramp controller 860 comprising the control coupler 662 (see FIG. 6B) inductively coupled to the AC power backbone 430 and the shunt switch 664 (see FIG. 6B) connected across the control coupler 662. The windings of the control coupler 662 may be wound on or around the same core (e.g., the core 610 of FIG. 6B) as the coupler 612. Since the couplers 612 and 662 are wound on or around the same core, the couplers 612 and 662 may share a substantial amount of magnetic flux passing through the core (e.g., the couplers 612 and 662 may have a high relative mutual inductance and may be tightly coupled to one another).

Operation of the schematic diagram 800 may be similar to that of the schematic diagram 700, as previously described in connection with FIG. 7A with the exception that the shunt switch 664 may be opened at substantially the same time as closing the switch 718 to provide power to the base coupler 615. In operation, to discontinue providing power to the base coupler 615 the shunt switch 664 may be closed and the switch 718 may be opened. Due to the high mutual inductance and shared core magnetic flux between the couplers 612 and 662, when the switch 718 is opened while the shunt switch 664 is closed, the very high transient switching voltage that would appear across the terminals of the switch 718 in FIG. 7A are substantially eliminated, since the magnetic flux that would drive this voltage spike, and act on the coupler 612, may be absorbed by and shunted into the control coupler 662. This may cause a large, relatively fast increase in a switching current passing though the control coupler 662 and the shunt switch 664, which may subsequently settle to a substantially lower value in a short time period.

FIG. 8B is another schematic diagram 850 illustrating the electrical relationship between the components of FIG. 6B, in accordance with another exemplary embodiment. As shown in FIG. 8B, the schematic diagram 850 includes all components as previously described in connection with FIG. 7A. The schematic diagram 850 also includes a power flow ramp controller 865. The power flow ramp controller 865 may comprise a boost converter structure. For example, the power flow ramp controller 865 may comprise the control coupler 662 and a reverse-connected diode 864 connected in parallel across the terminals of the control coupler 662. A coupler 866 may be connected in series with the parallel connected control coupler 662 and reverse-connected diode 864. The coupler 866 may be connected in series with a parallel connection of the switch 664 (see FIGS. 6B and 8A) and a diode 870 connected in series with a capacitor 872.

In operation, to discontinue providing power to the base coupler 615 the shunt switch 664 may be closed and the switch 718 may be opened. This may cause a large, relatively fast increase in an AC switching current passing though the control coupler 662. The reverse-connected diode 864 and the diode 870 may rectify the AC switching current into a DC current. The DC current may charge the capacitor 872 and provide a short-term storage for the shunted energy or power diverted from the coupler 612 and provided by the DC current, which may be utilized in some embodiments to power low voltage rails. In some embodiments, a load (see FIG. 8C) may be connected in parallel across the capacitor 872 to discharge the shunted charge stored on the capacitor 872.

FIG. 8C is another schematic diagram 880 illustrating the electrical relationship between the components of FIG. 6B, in accordance with another exemplary embodiment. As shown in FIG. 8C, the schematic diagram 880 includes all components as previously described in connection with FIG. 7B with the exception that the switch 718 is connected in parallel with the base coupler 615 rather than in parallel with the coupler 612. The schematic diagram 880 also includes the power flow ramp controller 865 previously described in connection with FIG. 8B. An advantage provided by a layout according to the schematic diagram 880 is that the resonance of each of the series-tuned double couple transformer (e.g., the coupler 612 and the coupler 714) and the parallel-tuned base coupler 615 and capacitor 716 may be collapsed without requiring a switch in the resonant current paths (e.g., the switch 718 is not placed in series with either of the coupler 612 or the base coupler 615). Since the switch 718 is not disposed in the resonant current path of the capacitor 716 and the base coupler 615, the switch 718 may have a lower current rating compared to an arrangement as shown in FIG. 8D described below. Since a lower current passes through the switch 718 compared to the arrangement of FIG. 8D, the switch 718 may also be more efficient. However, it is preferable that the switch 718 not be shorted (e.g., closed) when the switch 64 of the power flow ramp controller 865 is open to avoid prohibitively large current from flowing through the coupler 612 and the capacitor 714.

FIG. 8D is another schematic diagram 890 illustrating the electrical relationship between the components of FIG. 6B, in accordance with another exemplary embodiment. As shown in FIG. 8D, the schematic diagram 890 includes all components as previously described in connection with FIG. 7C. The schematic diagram 890 also includes a power flow ramp controller 867. The power flow ramp controller 867 may comprise the boost converter structure, as previously described in connection with FIG. 8B, and may further include the load shown as a discharge resistor 874. The operation of the schematic diagram 890 of FIG. 8D may be substantially as previously described in connection with FIGS. 7C and 8B, where the charge stored on the capacitor 872 of the power flow ramp controller 867 may be discharged through the discharge resistor 874.

Although FIGS. 8A and 8B show the arrangement as previously described in connection with FIG. 7A, and FIG. 8D shows the arrangement as previously described in connection with FIG. 7C, the present application is not so limited. For example, any of the arrangements as previously described in connection with FIGS. 7A-7D may be coupled with any of the power flow ramp controllers 860, 865 and 867, as previously described in connection with FIGS. 8A-8D, respectively.

Figure 9:
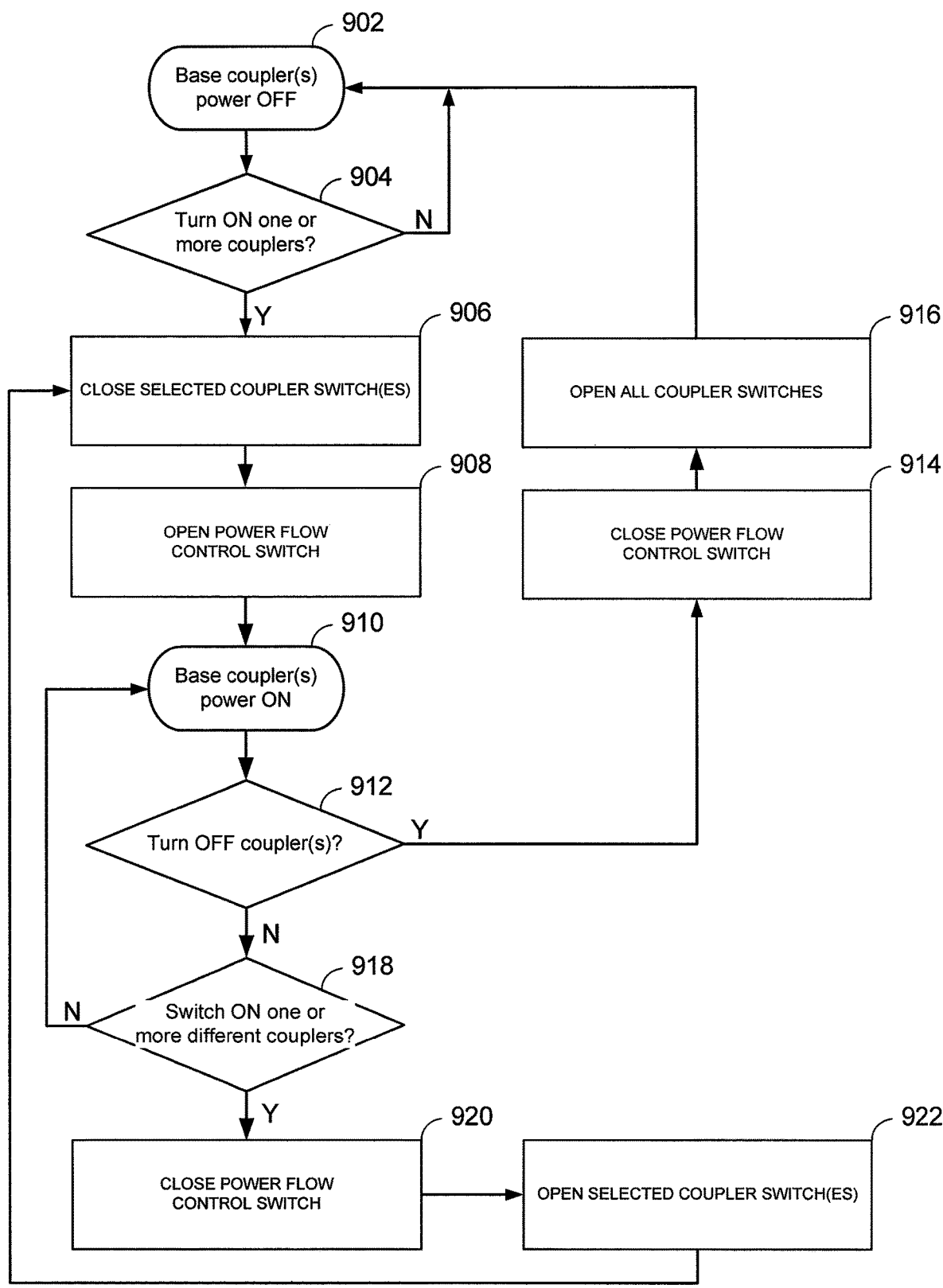
FIG. 9 is a flowchart depicting a method, in accordance with an exemplary embodiment.

FIG. 9 is a flowchart 900 depicting a method, in accordance with an exemplary embodiment. The method of flowchart 900 is described herein with reference to the wireless power transfer systems as previously described in connection with FIGS. 4-8C. In an embodiment, one or more of the blocks in flowchart 900 may be performed by a controller such as, for example, the local controllers 425a-425f as previously described in connection with FIG. 4. Although the method of flowchart 900 is described herein with reference to a particular order, in various embodiments, blocks herein may be performed in a different order, or omitted, and additional blocks may be added. In some embodiments, the flowchart 900 may apply as the vehicle (e.g., the vehicle 405 of FIG. 4) travels along the roadway 410 having the wireless power transfer system 400 installed therein. As shown in flowchart 900, blocks 902 and 910 may signify states that one or more of the base couplers (e.g., the base couplers 615 or 615a-615c of any of FIGS. 7A-8D) are currently in when the flowchart 900 has advanced to that particular block.

The method may begin at block 902 where all base couplers under the control of a particular controller (e.g., one of the local controllers 425a-425f of FIG. 4) are off (i.e., not energized). In such a state, the power flow control switch 664 (see FIGS. 6B, 8A-8C) is closed (ON) and all base coupler switches 718/720 (see FIGS. 7A-7D, 8A-8B and 8D) are open (OFF). Since all base coupler switches 718/720 are open, no current may flow from the coupler 612 to any of the base couplers 615. By contrast, for FIG. 8C, the base coupler switch 718 would be closed (OFF). The method may then advance to block 904.

At block 904, a controller (e.g. one of the local controllers 425a-425f of FIG. 4) may determine whether to turn ON one or more of the base couplers (e.g., the base couplers 615). For example, with respect to FIG. 4, a respective one of the local controllers 425a-425f may determine that a particular base coupler should be turned on when the vehicle 405 of FIG. 4 is aligned over that particular base coupler. If the determination is YES, the method may then advance to block 906. If the determination is NO, the method may circle back to block 902.

At block 906, the controller (e.g., one of the local controllers 425a-425f of FIG. 4) may close (turned ON) one or more selected coupler switches (e.g., the switches 718a-718c/720 of FIGS. 7A-8B and 8D) corresponding to the one or more base couplers that are to be turned. This may provide a current path from, for example, the coupler 612 to the selected one or more base couplers 615a-615c (see FIG. 8D). By contrast, for FIG. 8C, the base coupler switch 718 would be opened (turned OFF). The method may then advance to block 908.

At block 908, the controller (e.g., one of the local controllers 425a-425f of FIG. 4) may open (turn OFF) the power flow control switch (e.g., the switch 664 of FIGS. 6B, 8A-8D). This may cause the power flow ramp controller (e.g., the power flow ramp controller 867 of FIG. 8D) to present a high impedance to the AC power backbone 430 in comparison to the double couple transformer and selected base couplers (e.g., the coupler 612, the capacitor 714, the capacitor 716 and the base couplers 615a-615c that are turned ON). Thus, opening the power flow control switch 664 may effectively turn on the delivery of power to the selected base couplers 615a-615c. The method may then advance to block 910.

At block 910, the selected base couplers (e.g., one or more of the base couplers 615a-615c of FIGS. 7A-8C) are currently being powered. In this state, the switches 718a-718c corresponding to the selected base couplers are closed (turned ON) and the power flow control switch 664 is open (turned OFF). By contrast, for FIG. 8C, the switch 718 is opened (turned OFF).

The method may then advance to block 912 where the controller (e.g., one of the local controllers 425a-425f of FIG. 4) determines whether all currently powered base couplers should be turned OFF. For example, with respect to FIG. 4, a respective one of the local controllers 425a-425f may determine that all base couplers controlled by the respective local controller should be turned OFF since the vehicle 405 of FIG. 4 is no longer aligned over those particular base couplers. Accordingly, if the determination is YES, the method may advance to block 914. If the determination is NO, the method may alternatively advance to block 918.

At block 914, the controller (e.g., one of the local controllers 425a-425f of FIG. 4) may close (turn ON) the power flow control switch 664. Closing the power flow control switch 664 has the opposite effect of opening the power flow control switch 664. With the power flow control switch 664 closed, the power flow ramp controller 867 (see FIG. 8D) may present a low impedance to the AC power backbone 430 in comparison to the double couple transformer and selected base couplers (e.g., the coupler 612, the capacitor 714, the capacitor 716 and the base couplers 615a-615c that are turned ON). Thus, closing the power flow control switch 664 may effectively turn OFF the delivery of power to the selected base couplers 615a-615c. The method may then advance to block 916, where all coupler switches 718a-718c are opened (turned OFF). This may remove the current path from the coupler 612 to each of the base couplers 615a-615c. By contrast, for FIG. 8C, the base coupler switch 718 would be closed (turned ON). The method may then circle back to block 902, where all base couplers are in an OFF, non-powered state.

Turning back to the transition from block 912 to block 918, at block 918 the controller (e.g., one of the local controllers 425a-425f of FIG. 4) may determine whether one or more base couplers different from those that are already powered are to be powered. For example, if the vehicle 405 has proceeded along the plurality of base couplers and is now over a base coupler adjacent to the currently powered base coupler, the particular local controller 425 may determine that the currently powered base coupler should be turned OFF and the adjacent base coupler should now be powered. If the determination is NO, the method may circle back to block 910. If the determination is yes, the method may advance to block 920.

At block 920, the controller (e.g., one of the local controllers 425a-425f of FIG. 4) may close (turn ON) the power flow control switch 664 (see FIGS. 6B, 8A-8D). As previously described, closing the power flow control switch 664 will effectively turn OFF the delivery of power to the selected base couplers 615a-615c. The method may then advance to block 922, where the selected coupler switches 718a-718c corresponding to the base couplers that were previously powered but are now to be turned off are opened (turned OFF). By contrast, for FIG. 8C, the base coupler switch 718 would be closed (turned ON). The method may then circle back to block 906, where the newly selected coupler switches 718a-718c that were not previously ON but that are to be turned ON are closed (turned ON). By contrast, for FIG. 8C, the base coupler switch 718 would be opened (turned OFF). The method may then proceed from block 906 as previously described. In this way, the method of flowchart 900 may be used to activate an deactivate one or more base couplers while preventing an unsafe or undesired current or voltage spike in the charging system, as previously described in connection with FIGS. 8A-8C.

Figure 10:
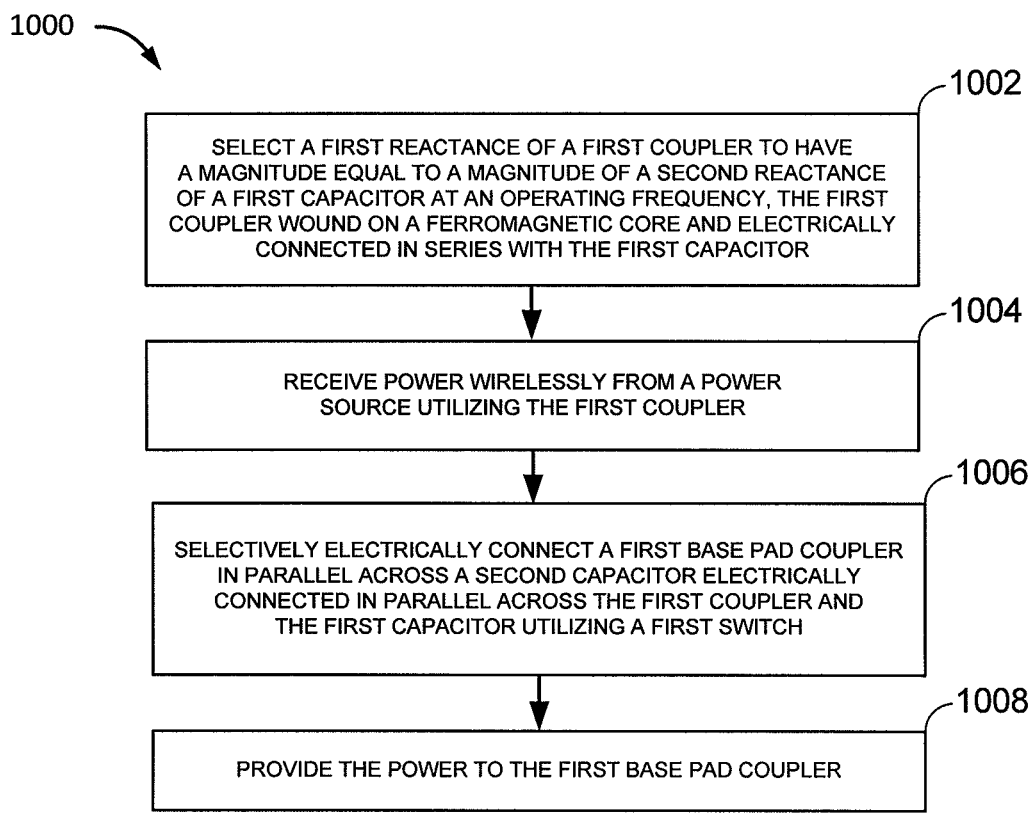
FIG. 10 is a flowchart depicting another method, in accordance with an exemplary embodiment.

FIG. 10 is a flowchart 1000 depicting another method, in accordance with an exemplary embodiment. The method of flowchart 1000 is described herein with reference to the wireless power transfer systems as previously described in connection with FIGS. 4-9. In an embodiment, one or more of the blocks in flowchart 1000 may be performed by a controller such as, for example, one of the local controllers 425a-425f as previously described in connection with FIG. 4. Although the method of flowchart 1000 is described herein with reference to a particular order, in various embodiments, blocks herein may be performed in a different order, or omitted, and additional blocks may be added. In some embodiments, the flowchart 1000 may apply as the vehicle (e.g., the vehicle 405 of FIG. 4) travels along the roadway 410 having the wireless power transfer system 400 installed therein.

The flowchart 1000 may start with block 1002, which includes selecting a first reactance of a first coupler (e.g., the coupler 612) to have a magnitude equal to a magnitude of a second reactance of a first capacitor (e.g., the capacitor 714) at an operating frequency. The first coupler (e.g., the coupler 612) is wound on a ferromagnetic core (e.g., the core 610) and is electrically connected in series with the first capacitor (e.g., the capacitor 714). The flowchart 1000 may then advance to block 1004, which includes receiving power wirelessly from a power source (e.g., the backbone power supply 435/the AC power backbone 430) utilizing the first coupler (e.g., the coupler 612). The flowchart 1000 may then advance to block 1006, which includes selectively electrically connecting a first base coupler (e.g., one of the base couplers 615a-615c) in parallel across a second capacitor (e.g., the capacitor 716) electrically connected in parallel across the first coupler (e.g., the coupler 612) and the first capacitor (e.g., the capacitor 714) utilizing a first switch (e.g., one of the switches 718a-718c). The flowchart 1000 may then advance to block 1008, which includes providing the power to the first base coupler (e.g., one of the base couplers 615a-615c).

Figure 11:
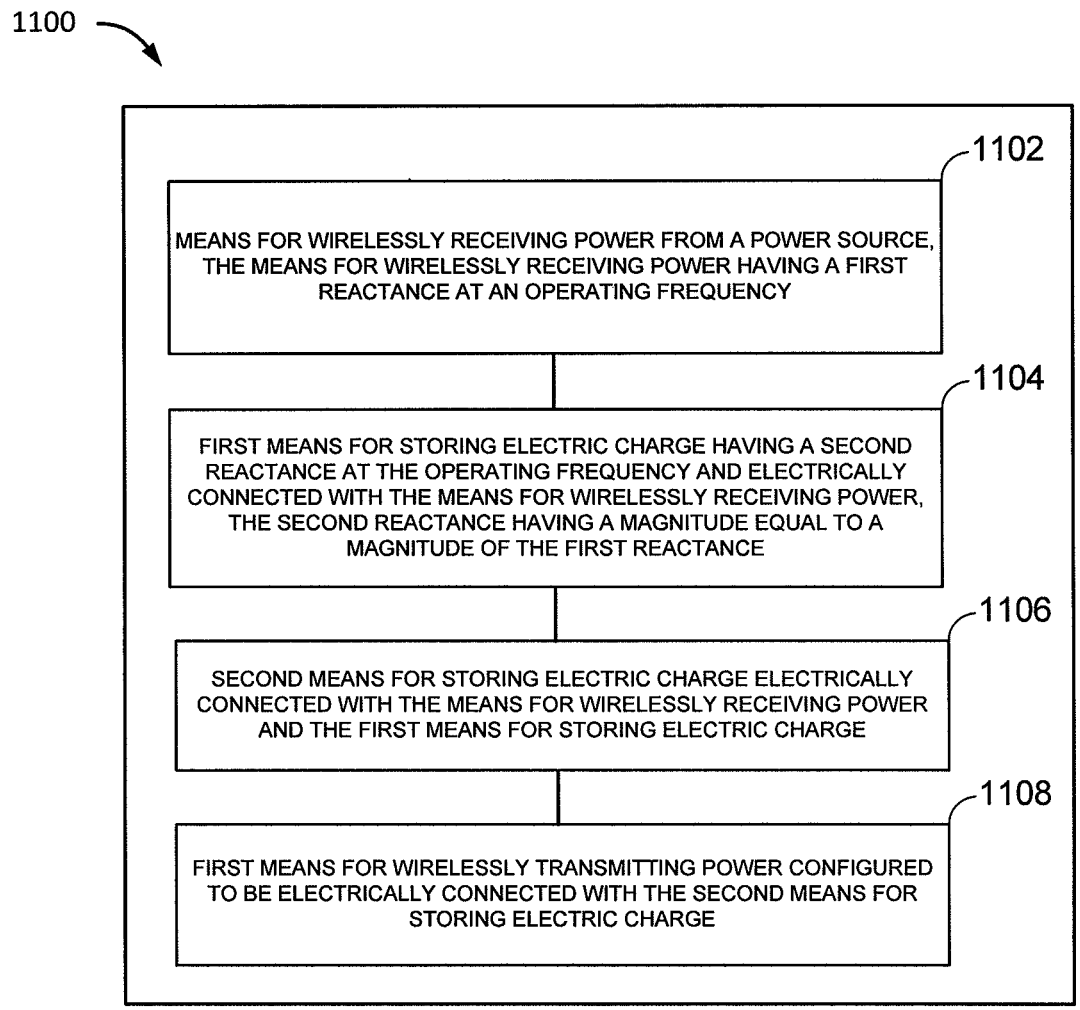
FIG. 11 is a functional block diagram of a wireless power transfer system, in accordance with an exemplary embodiment.

FIG. 11 is a functional block diagram of an apparatus 1100 for receiving wireless power, in accordance with an exemplary embodiment. The apparatus 1100 comprises means 1102, means 1104, means 1106 and means 1108 for the various actions previously discussed with respect to FIGS. 4-10. The apparatus 1100 includes means 1102 for wirelessly receiving power from a power source. The means 1102 for wirelessly receiving power has a first reactance at an operating frequency. In an embodiment, the means 1102 may be configured to perform one or more of the functions discussed above with respect to block 1004 of FIG. 10. In various embodiments, the means 1102 may be implemented by the coupler 612 (FIGS. 6A-8D).

The apparatus 1100 further includes first means 1104 for storing electric charge having a second reactance at the operating frequency and electrically connected with the means 1102 for wirelessly receiving power. The second reactance has a magnitude equal to a magnitude of the first reactance. In some embodiments, the first means 1104 may be configured to perform one or more of the functions discussed above with respect to block 1002 of FIG. 10. In various embodiments, the first means 1104 may be implemented by the capacitor 714 (FIGS. 7A-8D).

The apparatus 1100 further includes second means 1106 for storing electric charge connected with the means 1102 for wirelessly receiving power and the first means 1104 for storing electric charge. In some embodiments, the second means 1106 may be configured to perform one or more of the functions discussed above with respect to block 1006 of FIG. 10. In various embodiments, the second means 1106 may be implemented by the capacitor 716 (FIGS. 7A-8D).

The apparatus 1100 further includes first means 1108 for wirelessly transmitting power configured to be electrically connected with the second means 1106 for storing electric charge. In some embodiments, the first means 1108 may be configured to perform one or more of the functions discussed above with respect to blocks 1006 and 1008 of FIG. 10. In various embodiments, the first means 1108 may be implemented by one or more of the base couplers 615a-615c (FIGS. 7C and 8D).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such embodiment decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features have been described herein. It is to be understood that not necessarily all such advantages may be achieved in accordance with any particular embodiment. Thus, one or more embodiments achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. An apparatus for transmitting charging power wirelessly to a vehicle, the apparatus comprising:
    a first coupler having a first reactance at an operating frequency and configured to wirelessly receive power from a backbone power source, the first coupler wound on a ferromagnetic core;
    a first capacitor having a second reactance at the operating frequency and electrically connected in series with the first coupler, the second reactance having a magnitude equal to a magnitude of the first reactance;
    a second capacitor electrically connected in parallel across the first coupler and the first capacitor;
    a first base coupler configured to wirelessly transfer power to a vehicle pad, the first base coupler configured to be electrically connected in parallel across the second capacitor via a first switch;
    a second coupler wound on the same ferromagnetic core and inductively coupled to the backbone power source, wherein the first and second couplers are coupled via magnetic flux passing through the ferromagnetic core; and
    a shunt switch electrically connected to the second coupler and configured to short circuit the second coupler when the shunt switch is closed; and
    a plurality of base couplers including the first base coupler and a plurality of switches including the first switch, each of the plurality of base couplers configured to be electrically connected in parallel across the second capacitor via a corresponding switch of the plurality of switches, wherein a switch controller is configured to close the corresponding one of the plurality of switches and open the shunt switch to energize a selected one of the plurality of base couplers.

2. The apparatus of claim 1, a magnitude of a peak voltage across the second capacitor being proportional to a magnitude of a peak voltage induced in the first coupler at the operating frequency.

3. The apparatus of claim 1, the first reactance comprising a leakage inductance and the second reactance comprising a capacitance, the capacitance configured to substantially cancel out the leakage inductance at the operating frequency.

4. The apparatus of claim 1, the second capacitor having a third reactance at the operating frequency and base couplers of the plurality of base couplers that are electrically connected in parallel across the second capacitor having a combined reactance, the third reactance having a magnitude equal to a magnitude of the combined reactance.

5. The apparatus of claim 1, further comprising a power flow controller comprising the second coupler and the shunt switch, wherein the power flow controller comprises a boost converter.

6. The apparatus of claim 1, further comprising the switch controller that is configured to
    close the shunt switch and open the corresponding one of the plurality of switches to de-energize the selected one of the base couplers.

7. The apparatus of claim 1, further comprising a shunt capacitor connected in parallel with the shunt switch.

8. The apparatus of claim 7, wherein the shunt capacitor is configured to provide a voltage to a power supply rail.

9. A method for transmitting charging power wirelessly to a vehicle, the method comprising:
    selecting a first reactance of a first coupler to have a magnitude equal to a magnitude of a second reactance of a first capacitor at an operating frequency, the first coupler wound on a ferromagnetic core and electrically connected in series with the first capacitor;
    receiving power wirelessly from a backbone power source utilizing the first coupler;
    selectively electrically connecting a first base coupler configured to wirelessly transfer power to a vehicle pad in parallel across a second capacitor electrically connected in parallel across the first coupler and the first capacitor utilizing a first switch;
    providing the power to the first base coupler;
    receiving power wirelessly from the backbone power source inductively coupled to a second coupler wound on the same ferromagnetic core, wherein the first and second couplers are coupled via magnetic flux passing through the ferromagnetic core;
    short circuiting the second coupler by closing a shunt switch connected to the second coupler;
    selectively electrically connecting at least one of a plurality of base couplers including the first base coupler in parallel across the second capacitor utilizing a corresponding at least one of a plurality of switches including the first switch; and
    energizing a selected one of the plurality of base couplers by closing the corresponding one of the plurality of switches and then opening the shunt switch.

10. The method of claim 9, comprising providing a first voltage across the second capacitor, the first voltage having a peak magnitude proportional to a peak magnitude of a voltage induced in the first coupler at the operating frequency.

11. The method of claim 9, a capacitance of the second reactance substantially cancelling out a leakage inductance of the first reactance at the operating frequency.

12. The method of claim 9, comprising selecting a third reactance of the second capacitor to have a magnitude equal to a magnitude of a combined reactance of the connected at least one of the plurality of base couplers.

13. The method of claim 9, further comprising
    de-energizing the selected one of the base couplers by closing the shunt switch and then opening the corresponding one of the plurality of switches.

14. The method of claim 9, comprising storing power diverted to a shunt capacitor connected in parallel with the shunt switch.

15. The method of claim 14, comprising providing a voltage to a power supply rail utilizing the shunt capacitor.

16. A non-transitory computer-readable medium comprising code that, when executed, causes an apparatus to:
    select a first reactance of a first coupler to have a magnitude equal to a magnitude of a second reactance of a first capacitor at the operating frequency, the first coupler wound on a ferromagnetic core and electrically connected in series with the first capacitor;
    receive power wirelessly from a backbone power source utilizing the first coupler;

selectively electrically connect a first base coupler configured to wireless transfer power to a vehicle pad in parallel across a second capacitor electrically connected in parallel across the first coupler and the first capacitor utilizing a first switch;

provide the power to the first base coupler;

receive power wirelessly from the backbone power source inductively coupled to a second coupler wound on the same ferromagnetic core, wherein the first and second couplers are coupled via magnetic flux passing through the ferromagnetic core; and short circuit the second coupler by closing a shunt switch connected to the second coupler;

selectively electrically connect at least one of a plurality of base couplers including the first base coupler in parallel across the second capacitor utilizing a corresponding at least one of a plurality of switches including the first switch; and close the corresponding one of the plurality of switches and open the shunt switch to energize a selected one of the plurality of base couplers.

17. The non-transitory computer-readable medium of claim 16, wherein the code, when executed, causes the apparatus to provide a first voltage across the second capacitor, the first voltage having a peak magnitude proportional to a peak magnitude of a voltage induced in the first coupler at the operating frequency.

18. The non-transitory computer-readable medium of claim 16, wherein a capacitance of the second reactance substantially cancels out a leakage inductance of the first reactance at the operating frequency.

19. The non-transitory computer-readable medium of claim 16, wherein the code, when executed, causes the apparatus to select a third reactance of the second capacitor to have a magnitude equal to a magnitude of a combined reactance of the connected at least one of the plurality of base couplers.

20. The non-transitory computer-readable medium of claim 16, wherein the code, when executed, further causes the apparatus to close the shunt switch and open the corresponding one of the plurality of switches to de-energize the selected one of the base couplers.

21. The non-transitory computer-readable medium of claim 16, wherein the code, when executed, causes the apparatus to store power diverted to a shunt capacitor connected in parallel with the shunt switch.

22. An apparatus for transmitting charging power wirelessly to a vehicle, the apparatus comprising:

means for directing magnetic flux;

first means for wirelessly receiving power from a backbone power source, the first means for wirelessly receiving power having a first reactance at an operating frequency and wound on the means for directing magnetic flux;

first means for storing electric charge having a second reactance at the operating frequency and electrically connected with the means for wirelessly receiving power, the second reactance having a magnitude equal to a magnitude of the first reactance;

second means for storing electric charge electrically connected with the means for wirelessly receiving power and the first means for storing electric charge;

first means for wirelessly transmitting power to a vehicle pad electrically connected with the second means for storing electric charge via a first switch;

second means for wirelessly receiving power from the backbone power source inductively coupled to the power source, the second means for wirelessly receiving power wound on the same means for directing magnetic flux, wherein the first and second means for wirelessly receiving power are coupled via the magnetic flux passing through the means for directing magnetic flux;

means for short circuiting the second means for wirelessly receiving power, the means for short circuiting connected to the second means for wirelessly receiving power; and means for selectively electrically connecting at least one of a plurality of means for wirelessly transmitting power, including the first means for wirelessly transmitting power, in parallel across the second capacitor utilizing a corresponding at least one of a plurality of switches including the first switch; and energizing a selected one of the plurality of means for wirelessly transmitting by closing the corresponding one of the plurality of switches and then opening the means for short circuiting the second means for wirelessly receiving power.

23. The apparatus of claim 22, comprising a plurality of means for wirelessly transmitting power including the first means for wirelessly transmitting power, each of the plurality of means for wirelessly transmitting power configured to be electrically connected to the second means for storing charge.

* * * * *